(12) United States Patent
Otsuki et al.

(10) Patent No.: US 12,125,069 B2
(45) Date of Patent: Oct. 22, 2024

(54) AUTOMATED ORDER APPARATUS AND AUTOMATED ORDER METHOD FOR COMMODITIES

(71) Applicant: TOYOTA JIDOSHA KABUSHIKI KAISHA, Toyota (JP)

(72) Inventors: Nobuhisa Otsuki, Toyota (JP); Haeyeon Lee, Tokyo-to (JP); Yutaro Takagi, Tokyo-to (JP); Yuta Itozawa, Nagoya (JP); Hirotaka Komura, Tokyo-to (JP); Kunihiro Iwamoto, Nagakute (JP); Kota Oishi, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 221 days.

(21) Appl. No.: 17/840,149

(22) Filed: Jun. 14, 2022

(65) Prior Publication Data

US 2023/0012502 A1   Jan. 19, 2023

(51) Int. Cl.
*G06Q 10/087* (2023.01)
*G06Q 30/0251* (2023.01)
(Continued)

(52) U.S. Cl.
CPC ....... *G06Q 30/0271* (2013.01); *G06Q 10/087* (2013.01); *G06Q 30/0255* (2013.01); *G06Q 30/0635* (2013.01)

(58) Field of Classification Search
CPC ............. G06Q 30/0271; G06Q 10/087; G06Q 30/0255; G06Q 30/0635; G06Q 10/02
(Continued)

(56) References Cited

U.S. PATENT DOCUMENTS

| | | | |
|---|---|---|---|
| 2006/0016897 A1* | 1/2006 | Yasuda | A61B 50/30 235/492 |
| 2016/0140488 A1* | 5/2016 | Lindbo | B65G 1/1373 705/28 |

(Continued)

FOREIGN PATENT DOCUMENTS

| | | |
|---|---|---|
| JP | 2003-267509 A | 9/2003 |
| JP | 2005-235000 A | 9/2005 |

(Continued)

*Primary Examiner* — Garcia Ade
(74) *Attorney, Agent, or Firm* — Oliff PLC

(57) ABSTRACT

An automated order processing for order items registered in advance as commodities targeted for automated order service is performed. In the automated order processing, it is determined whether any container/package for the order items exists in the disposal box, based on internal status data of a disposal box or identification data on the contents of the container/package existing in the disposal box. If it is determined that any container/package for the order items exists in the disposal box, the number of discarded containers/packages for the order items existing in the disposal box is calculated. Then, it is determined whether the number of discarded containers/packages is equal to or larger than an upper threshold set according to a sales mode of the order items. If it is determined that the number of discarded containers/packages is equal to or larger than the upper threshold, ordering data of the order items is generated.

10 Claims, 12 Drawing Sheets

(51) Int. Cl.
*G06Q 30/0601* (2023.01)
*A61B 50/30* (2016.01)

(58) Field of Classification Search
USPC .......................................................... 705/28
See application file for complete search history.

(56) References Cited

U.S. PATENT DOCUMENTS

2019/0026693 A1* 1/2019 Kawaida .......... G06Q 10/06316
2022/0343264 A1* 10/2022 Wei .................. G06Q 10/06312

FOREIGN PATENT DOCUMENTS

| JP | 2006-039773 A | 2/2006 |
| JP | 2018-041234 A | 3/2018 |
| JP | 2018-185726 A | 11/2018 |

* cited by examiner

AUTOMATED ORDER APPARATUS AND AUTOMATED ORDER METHOD FOR COMMODITIES

The present disclosure claims priority under 35 U.S.C. § 119 to Japanese Patent Application No. 2021-116399, filed on Jul. 14, 2021, the contents of which application are incorporated herein by reference in their entirety.

TECHNICAL FIELD

The present disclosure relates to an apparatus and a method to automatically order articles (hereinafter also referred to as "commodities") consumed in a facility such as a residence or a business office.

BACKGROUND

JP 2018-185726 A discloses a garbage collection system. This conventional system identifies a container/package discarded into a garbage can in a household or an office and pinpoints a merchandise corresponding to the contents of the identified container/package. To encourage the consumer of the merchandise to buy new merchandises, the conventional system also performs the processing of showing advertisements for the merchandise pinpointed based on the container/package or for other merchandises related to the merchandise, on the consumer's terminal.

JP 2006-039773 A discloses an ordering system for medical articles. This conventional system orders new medical articles based on product information attached to packaging material of a medical article. The product information is read using an IC tag that becomes readable when the packaging material is opened. The medical article is ordered, when the packaging material is opened, by a computer system connected to a tag reader used to read the product information. That is, operations from reading of the product information to ordering of the medical article are carried out automatically when the packaging material is opened.

JP 2018-041234 A discloses an ordering system for medical materials. This conventional system includes a container adapted to store medical materials with IC tags attached thereto, a terminal connected to a tag reader, and a server adapted to manage the medical materials. The tag reader is attached to an opening of a storage container. When an unused medical material is taken out of the storage container, IC tag information is read by the tag reader and inventory status information about the medical material is updated. The inventory status information is grasped by the terminal. Based on the inventory status information, the terminal determines whether the medical material needs replenishment. If it is determined that replenishment is necessary, the terminal places an order with the server for the medical material.

There are various types of containers/packages for commodities. When classified according to raw material and shape, examples of containers/packages include glass bottles, aluminum cans, steel cans, PET bottles, paper containers/packages, and plastic containers/packages. The glass bottles, aluminum cans, steel cans, and PET bottles are mainly designed to contain liquid commodities. The paper containers/packages as well as the plastic containers/packages are mainly designed to contain solid commodities.

Considering an automated order service for commodities corresponding to the contents of discarded containers/packages. The timing to order commodities is important for the automated order service. A typical order timing is the timing of disposal of containers/packages. However, the typical timing may not be appropriate as order timing in some cases. Regarding liquid commodities, for example, chances are high that it is useful for users who use the automated order service to place an order when the remaining quantity of liquid falls low.

Regarding commodities, individually packed items may be sold by being enclosed in a single package (hereinafter also referred to as a "collective package") as a whole. Therefore, if automated order is done just when commodities enclosed in an individual pack are used up, the inventory of commodities held by the facility may become surplus. Thus, in order to order commodities with appropriate timing, it is necessary to take into consideration not only disposal modes, but also usage modes and sales modes of the commodities. Thus, it is necessary to conduct development from a viewpoint different from that of the conventional techniques described above.

It is an object of the present disclosure is to provide a technique capable of improving the convenience of users who use an automated order service for commodities consumed in facilities.

SUMMARY

A first aspect of the present disclosure is an automated order apparatus to provide an automated order service for commodities corresponding to contents of a container/package discarded in a disposal box possessed by a facility.

The automated order apparatus includes a memory and a processor. The memory stores internal status data of the disposal box or identification data on the contents of the container/package existing in the disposal box. The processor performs an automated order processing for order items registered in advance as commodities targeted for the automated order service.

In the automated order processing, the processor is configured to:
determine whether any container/package for the order items exists in the disposal box, based on the internal status data or the identification data on the contents;
calculate the number of discarded containers/packages for the order items existing in the disposal box based on the internal status data or the identification data on the contents if it is determined that any container/package for the order items exists in the disposal box;
determine whether the number of discarded containers/packages is equal to or larger than an upper threshold set according to a sales mode of the order items; and
generate ordering data of the order items if it is determined that the number of discarded containers/packages is equal to or larger than the upper threshold.

A second aspect of the present disclosure further has the following features besides those of the first aspect.

The memory further stores identification data on commodities existing in a depository possessed by the facility and adapted to store unused commodities or commodities in use.

In the automated order processing, the processor is configured to:
determine whether the order items exist in the depository, based on the identification data on the commodities;
calculate an inventory quantity of the order items based on the identification data on the commodities if it is determined that the order items exist in the depository;

determine whether the inventory quantity of the order items is larger than a lower threshold set according to the sales mode of the order items; and cancel an order for the order items placed based on the ordering data if it is determined that the inventory quantity of the order items is larger than the lower threshold.

A third aspect of the present disclosure further has the following features besides those of the first aspect.

In the automated order processing, the processor is configured to:

transmit a transmission report on the ordering data to a terminal of a user who uses the automated order service in the facility if the ordering data is generated; and cancel an order for the order items placed based on the ordering data if a cancel command is received from the terminal within a predetermined time after the transmission of the transmission report.

A fourth aspect of the present disclosure is an automated order apparatus to provide an automated order service for commodities stored in a depository possessed by a facility.

The automated order apparatus includes a memory and a processor. The memory stores identification data on commodities existing in the depository and usage status data on the commodities existing in the depository. The processor performs an automated order processing for order items registered in advance as commodities targeted for the automated order service.

In the automated order processing, the processor is configured to:

determine whether the order items exist in the depository, based on the identification data on the commodities;

calculate a remaining quantity of the order items based on the usage status data if it is determined that the order items exist in the depository;

determine whether the remaining quantity is equal to or smaller than a lower threshold set according to a usage mode of the order items; and generate ordering data of the order items if it is determined that the remaining quantity is equal to or smaller than the lower threshold.

A fifth aspect of the present disclosure further has the following features besides those of the fourth aspect.

In the automated order processing, the processor is configured to:

transmit a transmission report on the ordering data to a terminal of a user who uses the automated order service in the facility if the ordering data is generated; and cancel an order for the order items placed based on the ordering data if a cancel command is received from the terminal within a predetermined time after the transmission of the transmission report.

A sixth aspect of the present disclosure is an automated order method performed by a computer to provide an automated order service for commodities corresponding to contents of a container/package discarded in a disposal box possessed by a facility.

The automated order method comprises the steps of:

acquiring internal status data of the disposal box or identification data on the contents of the container/package existing in the disposal box;

determining whether any container/package for the order items registered in advance as commodities targeted for the automated order service exists in the disposal box, based on the internal status data or the identification data on the contents;

calculating the number of discarded containers/packages for the order items existing in the disposal box based on the internal status data or the identification data on the contents if it is determined that any container/package for the order items exists in the disposal box;

determining whether the number of discarded containers/packages is equal to or larger than an upper threshold set according to a sales mode of the order items; and generating ordering data of the order items if it is determined that the number of discarded containers/packages is equal to or larger than the upper threshold.

A seventh aspect of the present disclosure further has the following features besides those of the sixth aspect.

The automated order method further comprises the steps of:

acquiring identification data on commodities existing in a depository possessed by the facility and adapted to store unused commodities or commodities in use;

determining whether the order items exist in the depository, based on the identification data on the commodities;

calculating an inventory quantity of the order items based on the identification data on the commodities if it is determined that the order items exist in the depository;

determining whether the inventory quantity of the order items is larger than a lower threshold set according to the sales mode of the order items; and canceling an order for the order items placed based on the ordering data if it is determined that the inventory quantity of the order items is larger than the lower threshold.

An eighth aspect of the present disclosure further has the following features besides those of the sixth aspect.

The automated order method further comprises the steps of:

transmitting a transmission report on the ordering data to a terminal of a user who uses the automated order service in the facility if the ordering data is generated; and canceling an order for the order items placed based on the ordering data if a cancel command is received from the terminal within a predetermined time after the transmission of the transmission report.

A ninth aspect of the present disclosure is an automated order method performed by a computer to provide an automated order service for commodities stored in a depository possessed by a facility.

The automated order method comprises the steps of:

acquiring identification data on commodities existing in the depository and usage status data on the commodities existing in the depository;

determining whether the order items registered in advance as commodities targeted for the automated order service exist in the depository, based on the identification data on the commodities;

calculating a remaining quantity of the order items based on the usage status data if it is determined that the order items exist in the depository;

determining whether the remaining quantity is equal to or smaller than a lower threshold set according to a usage mode of the order items; and generating ordering data of the order items if it is determined that the remaining quantity is equal to or smaller than the lower threshold.

A tenth aspect of the present disclosure further has the following features besides those of the ninth aspect.

The automated order method further comprises the steps of:
  transmitting a transmission report on the ordering data to a terminal of a user who uses the automated order service in the facility if the ordering data is generated; and
  canceling an order for the order items placed based on the ordering data if a cancel command is received from the terminal within a predetermined time after the transmission of the transmission report.

According to the first or sixth aspect of the present disclosure, if it is determined that the number of discarded containers/packages for the order items in the disposal box is equal to or larger than the upper threshold, ordering data of the order items is generated. The upper threshold is set according to the sales mode of the order items. The determination by means of the upper threshold makes it possible to prevent trouble caused when the order items are packed individually. This makes it possible to improve the convenience of users.

According to the second or seventh aspect of the present disclosure, not only the disposal status of containers/packages for order items, but also the inventory status of the order items is taken into consideration. This ensures that trouble caused when the order items are packed individually can be prevented. This makes it possible to improve the convenience of users.

According to the third, fifth, eighth or tenth aspect of the present disclosure, if ordering data of the order items is generated, cancellation from the user can be accepted for a predetermined period of time after transmission of a transmission report on the ordering data. This makes it possible to provide the user with an opportunity to cancel ordering of order items or change to other commodities similar to the order items and thereby makes it possible to further improve the convenience of users.

According to the fourth or ninth aspect of the present disclosure, if it is determined that the remaining quantity of the order items existing in the depository is equal to or smaller than the lower threshold, ordering data of the order items is generated. The lower threshold is set according to the usage mode of the order items. The determination by means of the lower threshold makes it possible to order order items appropriately even when the disposal mode of commodities can change with the usage mode of the commodities. This makes it possible to improve the convenience of users.

DESCRIPTION OF EMBODIMENT

Figure 1:
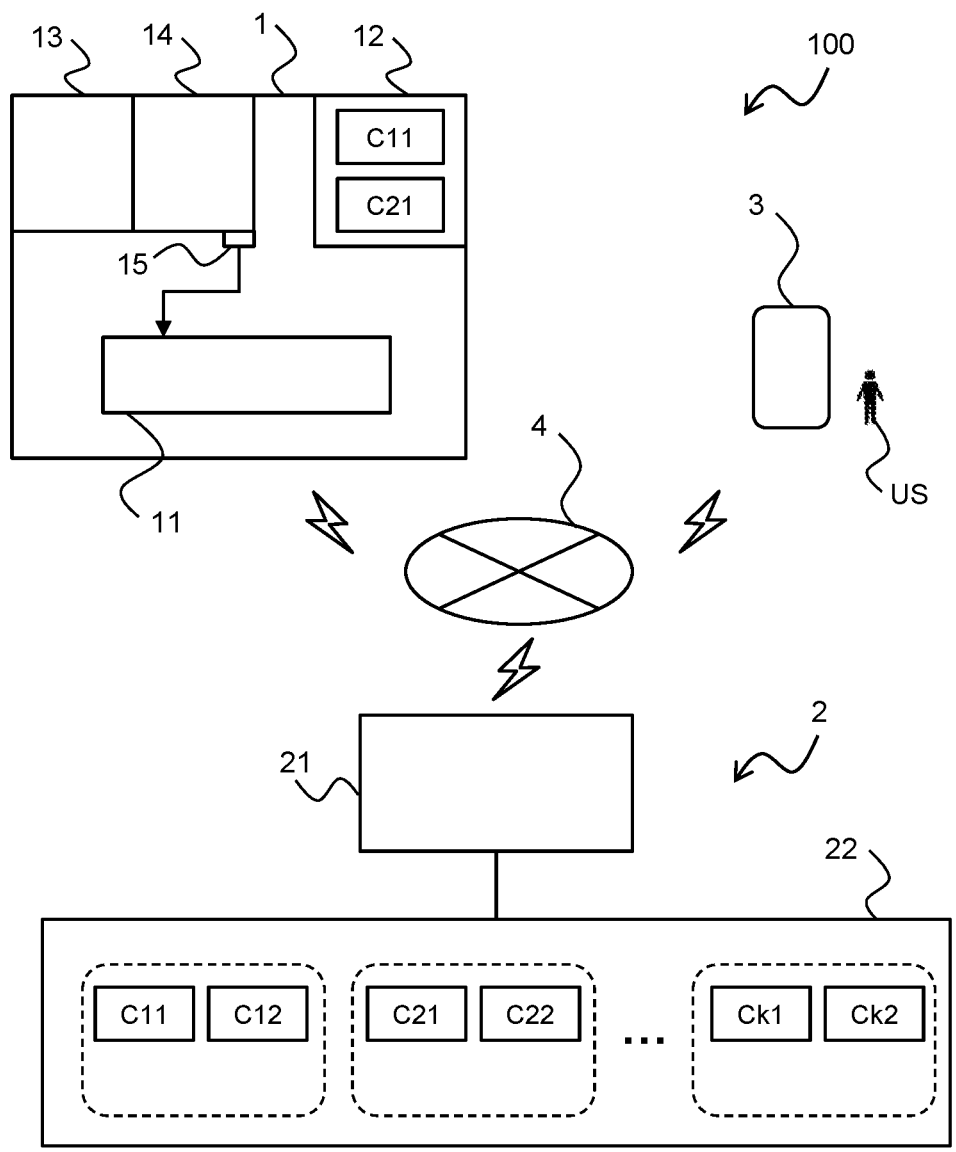
FIG. 1 is a diagram illustrating an outline of an automated order service.

An automated commodities ordering apparatus and automated commodities ordering method according to an embodiment of the present disclosure will be described below with reference to the accompanying drawings. Note that the automated order method according to the embodiment is implemented by computer processing performed by the automated order apparatus according to the embodiment. In the drawings, the same or equivalent components are denoted by the same reference signs, and description thereof will be simplified or omitted.

1. Automated Order Service

The automated order apparatus according to the embodiment provides an automated order service for commodities. FIG. 1 is a diagram illustrating an outline of the automated order service. A management system 100 shown in FIG. 1 includes a facility 1, a management center 2, and a terminal (hereinafter also referred to as a "user terminal") 3 of a user US who uses the automated order service in the facility, as components related to the automated order service. The facility 1, the management center 2, and the user terminal 3 exchange various data by communications via a network 4. Note that although one facility 1 is illustrated in FIG. 1, the total number of facilities 1 making up the management system 100 may be two or more.

The facility 1 is a building such as a residence or a business office where commodities are consumed by the user US either directly or indirectly. The facility 1 includes the automated order apparatus 11 according to the embodiment. The automated order apparatus 11 is a computer that performs an "automated order processing" for commodities consumed in the facility 1. Details of the automated order processing will be described later. The facility 1 also includes a depository 12 adapted to store various types of commodities. Examples of the depository 12 includes a storage rack, a storeroom, and a warehouse. In the example shown in FIG. 1, commodities C11 and commodities C21 are stored in the depository 12. A difference between the commodities C11 and the commodities C21 lies, for example, in merchandise categories (large classifications) to which the commodities belong.

The facility 1 further includes disposal boxes 13 and 14 in which the commodities C11 and the commodities C12 are discarded. Containers/packages for commodities consumed in the facility 1 are discarded in the disposal boxes 13 and 14. A difference between the disposal box 13 and the disposal box 14 lies in whether the containers/packages for commodities targeted for an automated order service (hereinafter also referred to as "order items") are discarded. The order items are registered in advance by the user US. According to the embodiment, containers/packages for the order items are discarded in the disposal box 14 and other containers/packages are discarded in the disposal box 13.

However, the containers/packages for order items may be discarded in the disposal box 13. For example, if automated order for order items is not desired, the user US discards the containers/packages in the disposal box 13. That is, the user US discards the containers/packages in the disposal box 14 only when the user US desires automated order for the order items.

The disposal box 14 is provided with a tag reader 15. The tag reader 15 reads identification data on the contents of the containers/packages existing in the disposal box 14 using short-range wireless communications. The identification data is recorded, for example, on an identification tag (e.g., an RFID tag) attached to each of the containers/packages. The identification data is read by the tag reader 15 when any container/package exists in the disposal box 14. The identification data includes data unique to commodities such as data on the manufacturer and type of the commodities. The identification data also includes data regarding the sales mode of the commodities (specifically, whether the commodities are sold in a collective package). The identification data read by the tag reader 15 is transmitted to the automated order apparatus 11.

In another example of the embodiment, a camera is provided instead of the tag reader 15 to photograph the internal status of the disposal box 14. The internal status data of the disposal box 14 photographed by the camera is transmitted to the automated order apparatus 11. The installation location of the camera is not specifically limited as long as the internal status of the disposal box 14 can be photographed. The camera may be installed near a garbage input port provided in a mobile body (specifically, a refuse collector) and used to take out and collect contents (i.e., packaging containers) from the disposal box 14.

The management center 2 performs inventory management of various types of commodities. The management center 2 includes a server 21 and a warehouse 22. The server 21 is a computer that performs processes related to inventory management of various types of commodities C11, C12, . . . Ck1, Ck2 (where k is a natural number equal to or larger than 3) stored in the warehouse 22. The processes related to inventory management includes the processes of recording receipts and shipments of commodities stored in the warehouse 22, setting storage positions of commodities, and delivering commodities. The processes related to inventory management may include part of an automated order processing performed by the automated order apparatus 11. In this case, the server 21 receives identification data on the contents or internal status data from the facility 1 and generates ordering data of the order items.

In the example shown in FIG. 1, commodities C11, C12, . . . Ck1, and Ck2 are stored in the warehouse 22. A difference between the commodities Ck1 and Ck2 lies in the hierarchy level (middle classification or small classification) of merchandises belonging to the same category (large classification). A difference between the commodities Ck1 and Ck2 may lie in quantity units (packaging types) of merchandises belonging to the same category (small classification).

The user terminal 3 is a computer of the user US. The user terminal 3 may be a computer the facility 1 is equipped with or a terminal (e.g., a tablet or a smartphone) carried individually by the user US. Order items are registered and deregistered via the user terminal 3. Identification data of the user terminal 3 (i.e., identification data of the user US) is shared by the automated order apparatus 11 and the server 21 by being associated with identification data of the facility 1 and registration data of order items.

Figure 2:
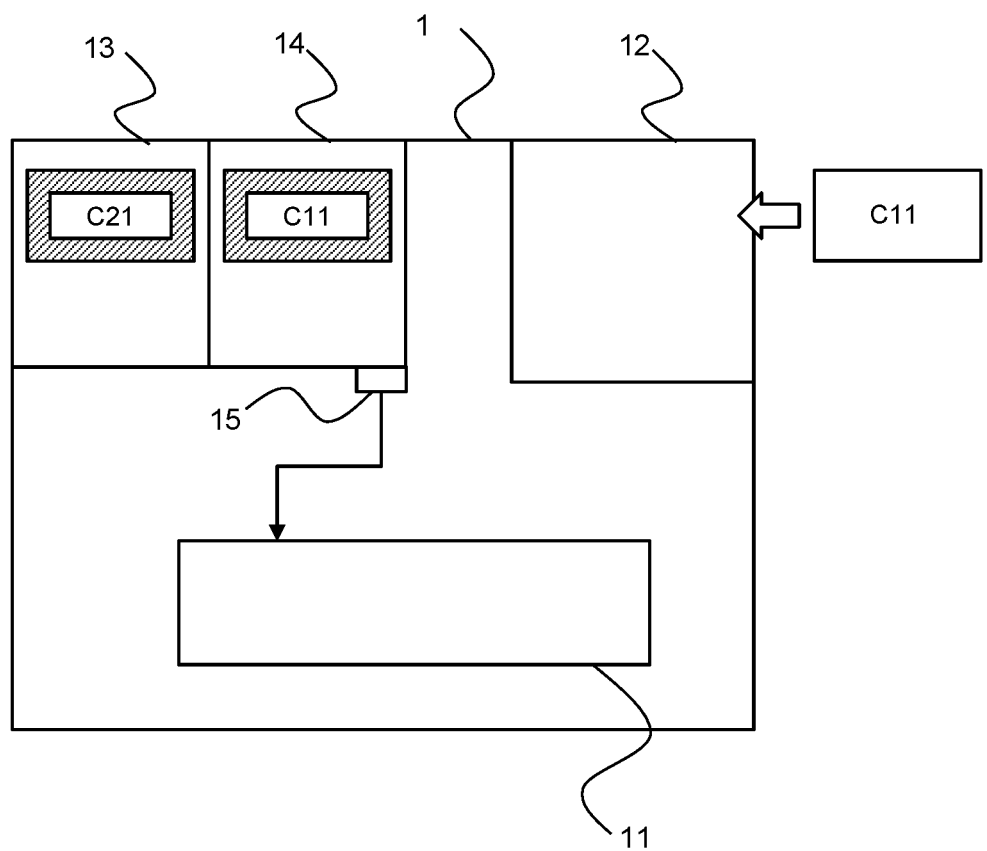
FIG. 2 is a diagram illustrating a basic flow of automated order processing according to an embodiment.

2. Outline of Automated Order Processing 2-1. First Problem of Automated Order Processing FIG. 2 is a diagram illustrating a basic flow of automated order processing according to the embodiment. A configuration example of the facility 1 shown in FIG. 2 is as illustrated in FIG. 1. In the example shown in FIG. 2, the commodities C11 and C21 stored in the depository 12 in FIG. 1 are consumed and the containers/packages for the commodities are deposited in the disposal boxes 13 and 14. The containers/packages for the commodities C21 are located in the disposal box 13 and the containers/packages for the commodities C11 are located in the disposal box 14. That is, in the example shown in FIG. 2, the commodities C11 correspond to order items.

When the commodities C11 are discarded in the disposal box 14, identification data on the contents (i.e., the commodities C11) of the containers/packages are read by the tag reader 15. The automated order apparatus 11 collates the identification data on the contents with the registration data of the order items. If the two sets of data match each other, the automated order apparatus 11 generates ordering data of the commodities C11 and transmits the ordering data outside (i.e., to the server 21). Then, the server 21 performs the processing of sending the commodities C11 based on the ordering data. Consequently, the depository 12 is replenished with the commodities C11.

In another example, based on the internal status data of the disposal box 14 acquired by the camera, the contents of the containers/packages existing in the disposal box 14 are pinpointed. The contents are pinpointed by machine learning using, for example, image data of containers/packages as teacher data. Based on the result of pinpointing, the automated order apparatus 11 determines whether the contents (i.e., the commodities C11) of the containers/packages are order items. If it is determined that the contents of the containers/packages are order items, the automated order apparatus 11 generates ordering data of the commodities C11. The subsequent flow is the same as the example described above.

Figure 3:
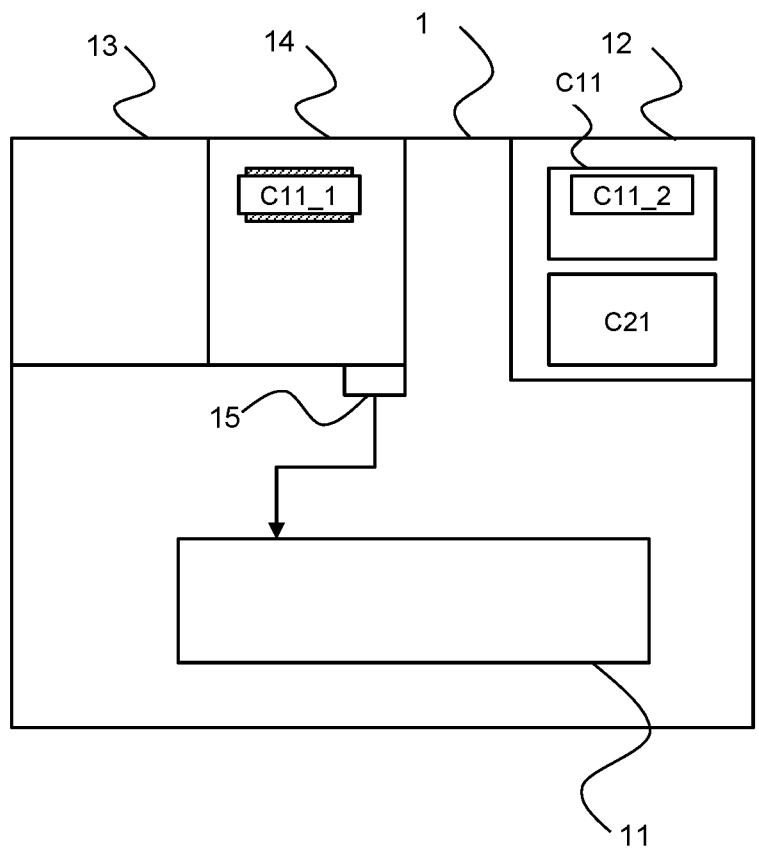
FIG. 3 is a diagram illustrating a problem caused if individual packages are discarded in a disposal box.

However, with the automated order processing described above, trouble occurs if the containers/packages for the commodities C11 discarded in the disposal box 14 use individual packages. FIG. 3 is a diagram illustrating a problem caused if individual packages are discarded in the disposal box 14. In the example shown in FIG. 3, commodities C11_1 taken out of a collective package of commodities C11 are consumed and an individual package of the commodities C11_1 is discarded in the disposal box 14. On the other hand, commodities C11_2 contained in the collective package remain in the depository 12.

When the collective package of the commodities C11 and the individual packages of the commodities C11_1 and commodities C11_2 are all discarded in the disposal box 14, desirably the commodities C11 are ordered and replenished. On the other hand, if some of the individual packages of the commodities C11 are discarded in the disposal box 14 or if the collective package of the commodities C11 and some of the individual packages are discarded in the disposal box 14, it is likely that ordering and replenishment of the commodities C11 are unnecessary. In particular, when only some of the individual packages of the commodities C11 are discarded, if the commodities C11 are ordered and replenished, the inventory of the commodities C11 in the depository 12 may become surplus.

2-2. First Example

Thus, in a first example of the automated order processing according to the embodiment, a maximum discard count UTN is set according to the sales mode of the order items in the configuration example shown in FIG. 2. The maximum discard count UTN is an upper threshold of the number of discarded containers/packages for order items, and is set according to a classification division (collective package or individual package) of the containers/packages for order items. An initial value of the maximum discard count UTN is a fixed value. The initial value for the collective package is set to a smaller value than the initial value for the individual package. The initial values may be changed as desired by the user US. In this case, the user US sets the maximum discard count UTN by operating the user terminal 3.

In the first example, it is determined whether the number of discarded containers/packages for order items in the disposal box 14 is equal to or larger than the maximum discard count UTN. If it is determined that the number of discarded containers/packages is equal to or larger than the maximum discard count UTN, ordering data of the order items is generated. The use of such a maximum discard count UTN, makes it possible to prevent trouble caused when order items are packed individually. Besides, as the initial value of the maximum discard count UTN is set appropriately or changed to an appropriate value by the user US, the order items can be ordered and replenished with timing that suits the taste of the user US.

2-3. Second Example

In a second example of the automated order processing according to the embodiment, in addition to the maximum discard count UTN, a minimum inventory quantity LSN is set according to the sales mode of the order items. The minimum inventory quantity LSN is the lower threshold of the inventory quantity of the order items stored in the depository 12, and is set according to the classification division of the containers/packages for order items. As with the maximum discard count UTN, an initial value of the minimum inventory quantity LSN is a fixed value, but may be changed as desired by the user US.

In the second example, as with the first example, if it is determined that the number of discarded containers/packages is equal to or larger than the maximum discard count UTN, ordering data of the order items is generated. The process up to this point is the same as the first example. However, in the second example, if it is determined that the number of discarded containers/packages is equal to or larger than the maximum discard count UTN, it is determined whether the inventory quantity SN of the order items existing in the depository 12 is larger than the minimum inventory quantity LSN. The inventory quantity SN is calculated by grasping the identification data on the contents or the internal status data in the depository 12.

Figure 4:
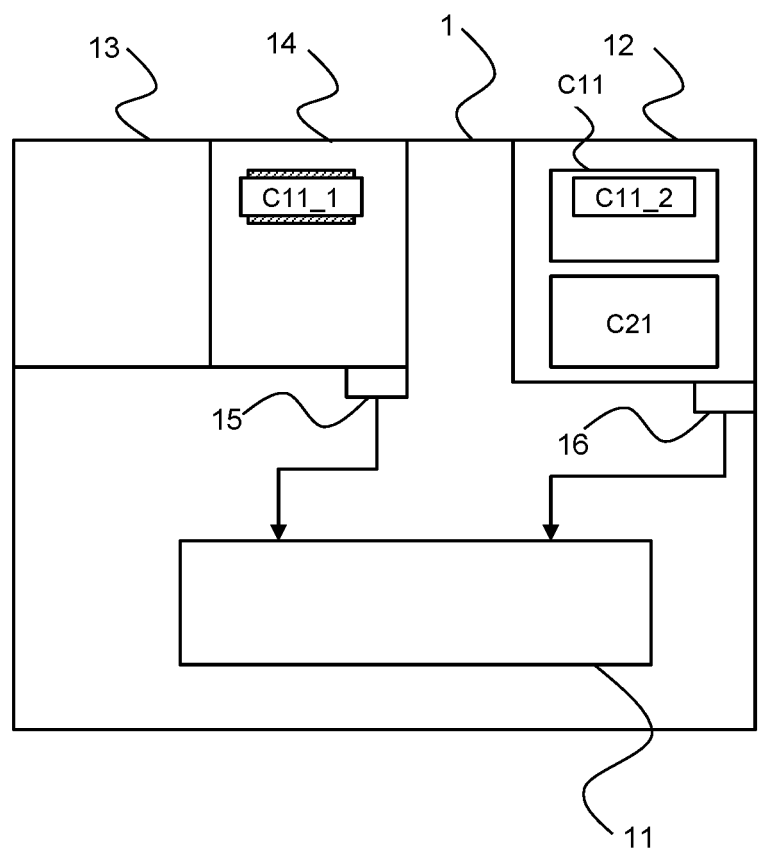
FIG. 4 is a diagram showing a configuration example of a facility that implements a second example of the automated order processing according to the embodiment.

FIG. 4 is a diagram showing a configuration example of the facility 1 that implements the second example of the automated order processing according to the embodiment. The example shown in FIG. 4 is obtained by further adding a tag reader 16 to the configuration example shown in FIG. 2. The tag reader 16 reads identification data on the contents of the containers/packages existing in the depository 12 using short-range wireless communications. Basic functions of the tag reader 16 are the same as those of the tag reader 15. A camera may be used instead of the tag reader 16. In this case, internal status data of the depository 12 is acquired by the camera. The installation location of the camera is not specifically limited as long as the internal status of the depository 12 can be photographed.

In the second example, the inventory quantity SN is calculated based on the identification data on the contents read by the tag reader 16 or the internal status data of the depository 12 acquired by the camera. Then, when it is determined that the inventory quantity SN is larger than the minimum inventory quantity LSN, ordering based on the ordering data is canceled. In this way, according to the second example, not only the disposal status of containers/packages for order items, but also the inventory status of the order items is taken into consideration. This ensures that trouble caused when the order items are packed individually can be prevented. Besides, as the initial value of the minimum inventory quantity LSN is set appropriately or changed to an appropriate value by the user US, the order items can be ordered and replenished with timing that suits the taste of the user US.

2-4. Second Problem of Automated Order Processing

The first and second examples described above are modification examples focusing on the fact that the disposal mode of commodities can change with the sales mode of the commodities. Here, conceivably factors that affect the disposal mode of commodities include the usage mode of the commodities. For example, with liquid commodities, it is rarely the case that the containers/packages for the commodities are discarded each time the commodities are used. That is, liquid commodities are stored in the depository 12 by being kept in their containers/packages after each use. Not only liquid commodities, but also other commodities returned to the depository 12 by being kept in their containers/packages are desirably ordered and replenished when their remaining quantities fall low.

2-5. Third Example

Thus, in a third example of the automated order processing according to the embodiment, in addition to the identification data described in the first example, data on the usage mode (specifically, whether the commodities are a single-use type) of commodities is recorded on the identification tag. In the third example, rather than the maximum discard count UTN described in the first example, a minimum remaining quantity LSA is set according to the usage mode of the order items. The minimum remaining quantity LSA is the lower threshold of the remaining quantity of the order items stored in the depository 12. As with the maximum discard count UTN, an initial value of the minimum remaining quantity LSA is a fixed value, but may be changed as desired by the user US.

In the third example, it is determined whether order items exist in the depository 12 based on the identification data on the contents read by the tag reader 16 or the internal status data acquired by the camera. Then, if it is determined that order items exist in the depository 12, it is determined whether the order items are commodities having such a property that the commodities are taken in and out of the depository 12 each time the commodities are used (i.e., whether the order items are multiple-use commodities). Note that the property determination is made by collating identification data or internal status data with the registration data of the order items. Then, if it is determined that the order items are multiple-use commodities, the remaining quantity SA of the order items is calculated. The remaining quantity SA is calculated by grasping the usage status data of the order items in the depository 12.

Figure 5:
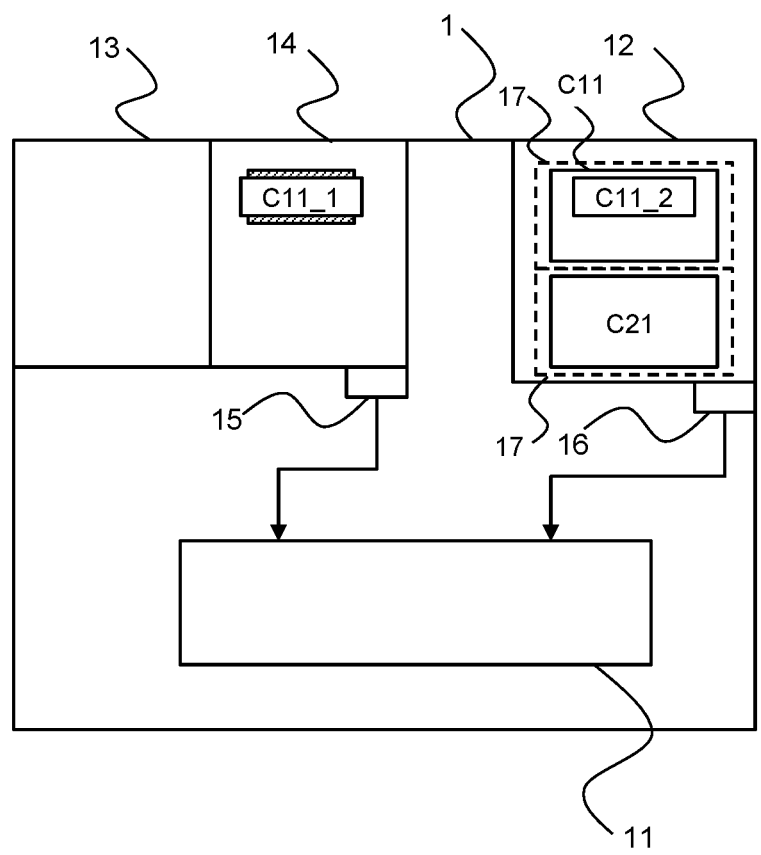
FIG. 5 is a diagram showing a configuration example of a facility that implements a third example of the automated order processing according to the embodiment.

FIG. 5 is a diagram showing a configuration example of the facility 1 that implements the third example of the automated order processing according to the embodiment. The example shown in FIG. 5 is obtained by further adding a weight sensor 17 to the configuration example shown in FIG. 4. The weight sensor 17 measures the weight of the containers/packages that are located in the depository 12 and contain order items. The identification data makes it possible to grasp the weight of the containers/packages containing unused order items. This in turn makes it possible, for example, to calculate the remaining quantity SA, that is, a difference between the overall weight of the order items including the containers/packages and the weight (i.e., the usage status data) measured by the weight sensor 17, where the overall weight is grasped based on the identification data. When the contents of the containers/packages can be recognized from outside, a camera may be used instead of the weight sensor 17. In this case, the usage status data is calculated based on image data acquired by a camera.

In the third example, it is also determined whether the remaining quantity SA is equal to or smaller than the minimum remaining quantity LSA. If it is determined that the remaining quantity SA is equal to or smaller than the minimum remaining quantity LSA, ordering data of the order items is generated. In this way, according to the third example, even when the disposal mode of commodities can change with the usage mode of the commodities, the order items can be ordered and replenished with appropriate timing. Besides, as the initial value of the minimum remaining quantity LSA is set appropriately or changed to an appropriate value by the user US, the order items can be ordered and replenished with timing that suits the taste of the user US.

Configuration examples of the automated order apparatus used to implement the above-described first to third modification examples of the automated order processing will be described below.

3. Configuration Examples of Automated Order Apparatus

Figure 6:
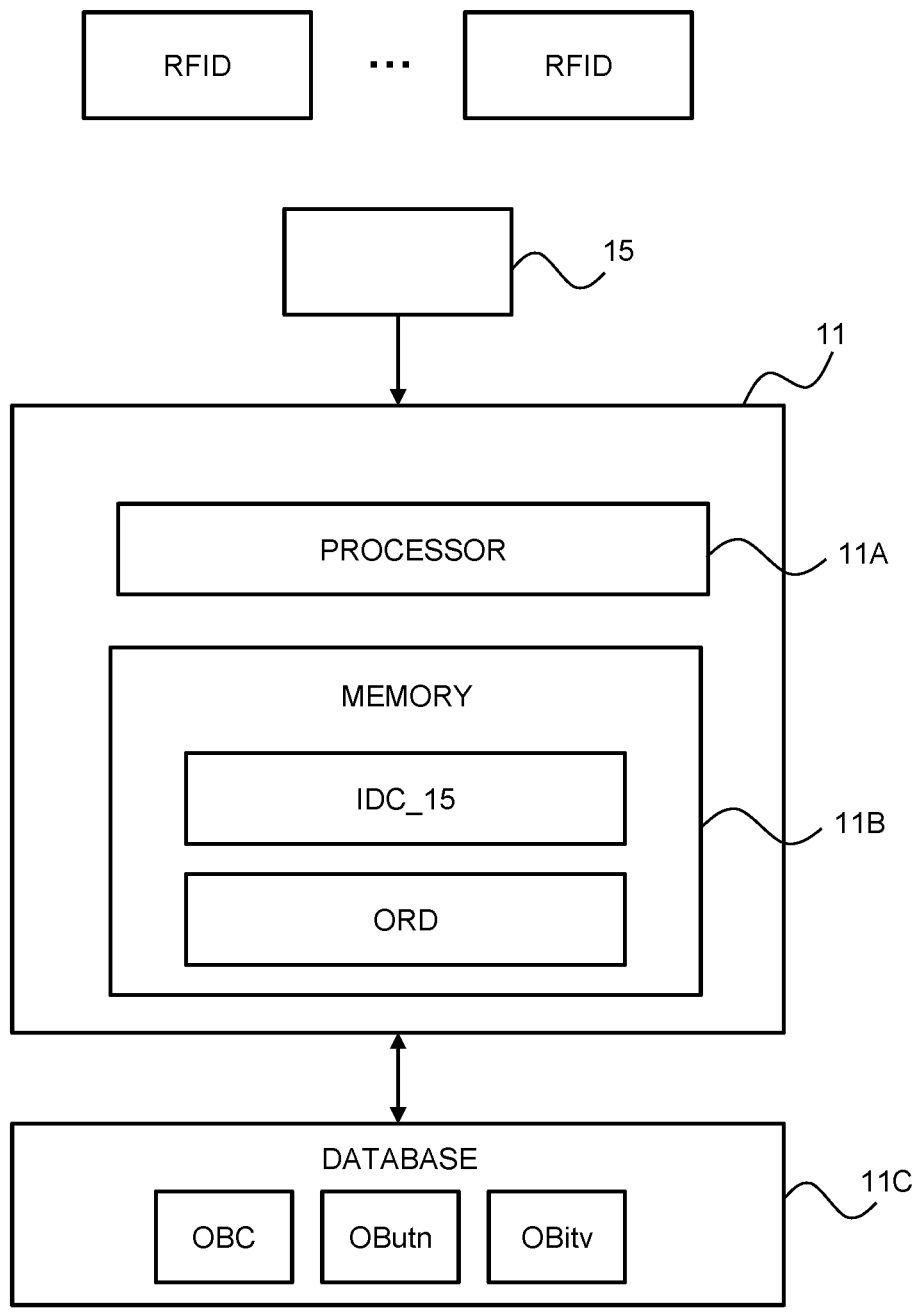
FIG. 6 is a diagram showing a first configuration example of an automated order apparatus according to the embodiment.
Figure 7:
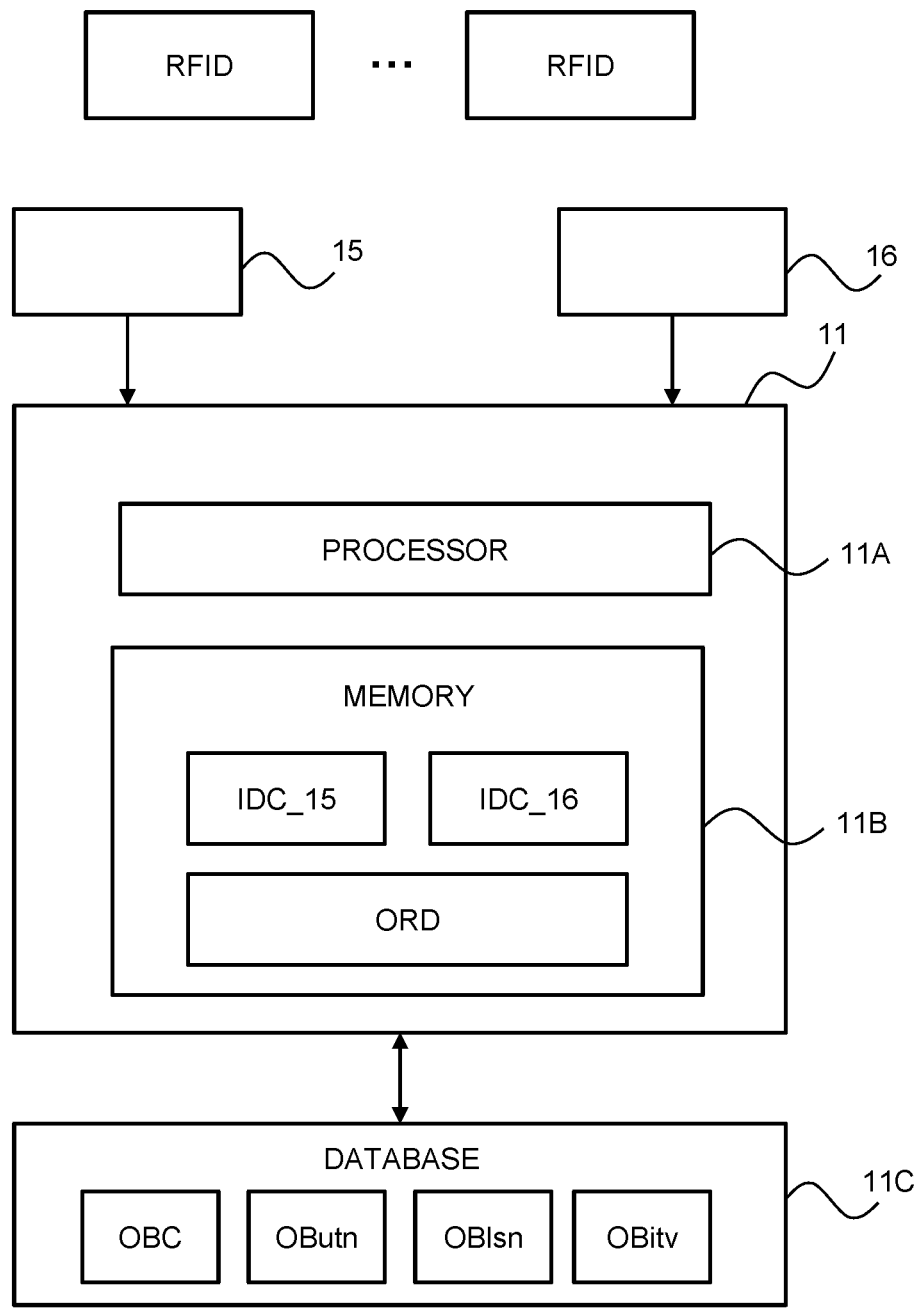
FIG. 7 is a diagram showing a second configuration example of the automated order apparatus according to the embodiment.
Figure 8:
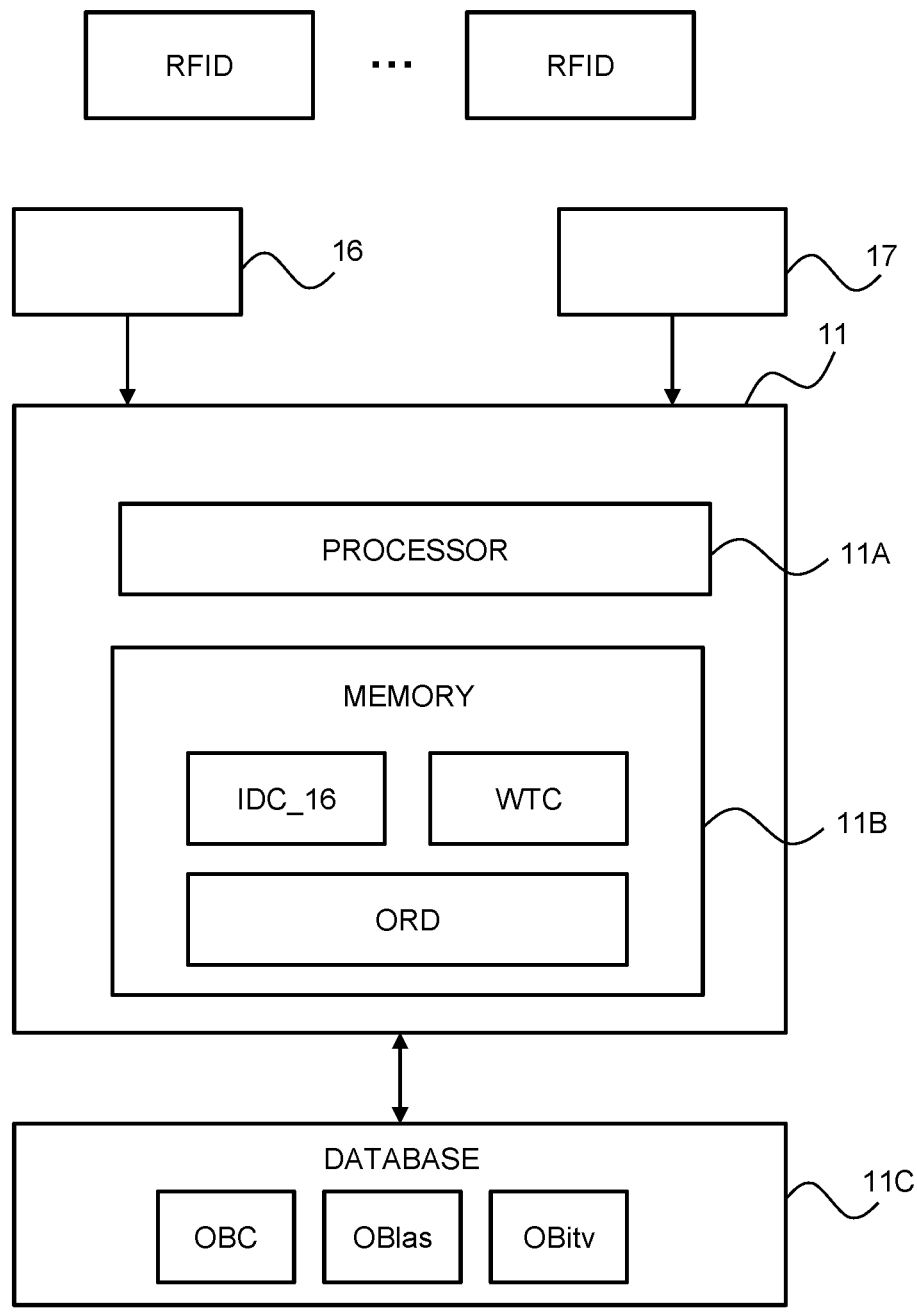
FIG. 8 is a diagram showing a third configuration example of the automated order apparatus according to the embodiment.

FIG. 6 is a diagram showing a first configuration example of the automated order apparatus according to the embodiment. FIG. 6 is a configuration example used to implement the first modification example described above. FIG. 7 is a diagram showing a second configuration example of the automated order apparatus according to the embodiment. FIG. 7 is a configuration example used to implement the second modification example described above. FIG. 8 is a diagram showing a third configuration example of the automated order apparatus according to the embodiment. FIG. 8 is a configuration example used to implement the third modification example described above.

As shown in FIGS. 6 to 8, the automated order apparatus 11 includes a processor 11A, a memory 11B, and a database 11C.

The processor 11A includes a CPU. The memory 11B stores various data needed for processes performed by the processor 11A. Examples of the memory 11B includes a volatile memory, a nonvolatile memory, an HDD, and an SSD. As the processor 11A executes a computer program, various functions of the automated order apparatus 11 are implemented. The computer program is stored in the memory 11B. However, the computer program may be recorded on a computer-readable recording medium. The computer program may be provided from outside (e.g., the server 21) via a network.

In the first configuration example shown in FIG. 6, various data stored in the memory 11B includes identification data IDC_15 and ordering data ORD. The identification data IDC_15 is data (e.g., RFID data) on the contents of a packaging container read by the tag reader 15. If a camera is provided on the disposal box 14 instead of the tag reader 15, the internal status data of the disposal box 14 is stored in the memory 11B instead of the identification data IDC_15. The ordering data ORD is generated when it is determined that the number of discarded container/packages for order items, as calculated based on the identification data IDC_15 or the internal status data, is equal to or larger than the maximum discard count UTN.

In the second configuration example shown in FIG. 7, various data stored in the memory 11B includes identification data IDC_15 and IDC_16 and ordering data ORD. The identification data IDC_16 is data on the contents of a packaging container read by the tag reader 16. If a camera is provided on the depository 12 instead of the tag reader 16, the internal status data of the depository 12 is stored in the memory 11B instead of the identification data IDC_16. The identification data IDC_15 and the ordering data ORD are common to the first configuration example shown in FIG. 6.

In the third configuration example shown in FIG. 8, various data stored in the memory 11B includes identification data IDC_16, weight data WTC, and ordering data ORD. The weight data WTC is data on the weight of the containers/packages containing order items, where the weight is measured by the weight sensor 17. If a camera is provided on the depository 12 instead of the weight sensor 17, usage status data of the order items is stored in the memory 11B instead of the weight data WTC. The identification data IDC_16 and the ordering data ORD are common to the second configuration example shown in FIG. 7.

In the first configuration example shown in FIG. 6, data OBC on the order items has been registered in the database 11C. The data OBC is registered by the user US. Also, data OButn on the maximum discard count UTN of order items has been registered in the database 11C. Furthermore, data OBitv on a replenishment interval of order items has been registered in the database 11C. The replenishment interval is an estimated time interval from when order items are ordered to when the order items are delivered to the facility 1.

As with the maximum discard count UTN, an initial value of the replenishment interval is a fixed value, but may be changed as desired by the user US. The initial value of the replenishment interval is set for each type of order item. As the initial value of the replenishment interval is set for each type of order item, order items can be replenished with timing that suits the taste of the user US. If schedule data of the user US is available, a time slot for replenishment may be adjusted to a time slot in which the user US stays at the facility 1. Alternatively, adjustments may be made to avoid time slots in which the user US is absent from the facility 1.

In the second configuration example shown in FIG. 7, the data OBC on the order items, the data OButn on the maximum discard count UTN, data OBlsn on the minimum inventory quantity LSN, and the data OBitv on replenishment intervals have been registered in the database 11C. That is, in the second configuration example, in addition to the data described in the first configuration example, the data OBlsn on the minimum inventory quantity LSN has been registered in the database 11C.

In the third configuration example shown in FIG. 8, the data OBC on the order items, data OBlsa on the minimum remaining quantity LSA, and the data OBitv on replenishment intervals have been registered in the database 11C. That is, in the third configuration example, instead of the data OButn on the maximum discard count UTN described in the first configuration example, the data OBlsa on the minimum remaining quantity LSA has been registered in the database 11C.

Note that, when part of the automated order processing performed by the automated order apparatus 11 is carried out as an inventory-management-related processing of the server 21, the above description can be read on the understanding that components of the automated order apparatus 11 such as the processor 11A, the memory 11B, and the database 11C are provided on the server 21. In this case, it is sufficient that the automated order apparatus 11 has only the function to transmit identification data IDC_15 on the contents, internal status data, and the like to the server 21.

4. Examples of Automated Order Processing

Next, a flow of the automated order processing performed by the automated order apparatus 11 (processor 11A) according to the embodiment will be described with reference to FIGS. 9 to 12.

4-1. First Processing Example

Figure 9:
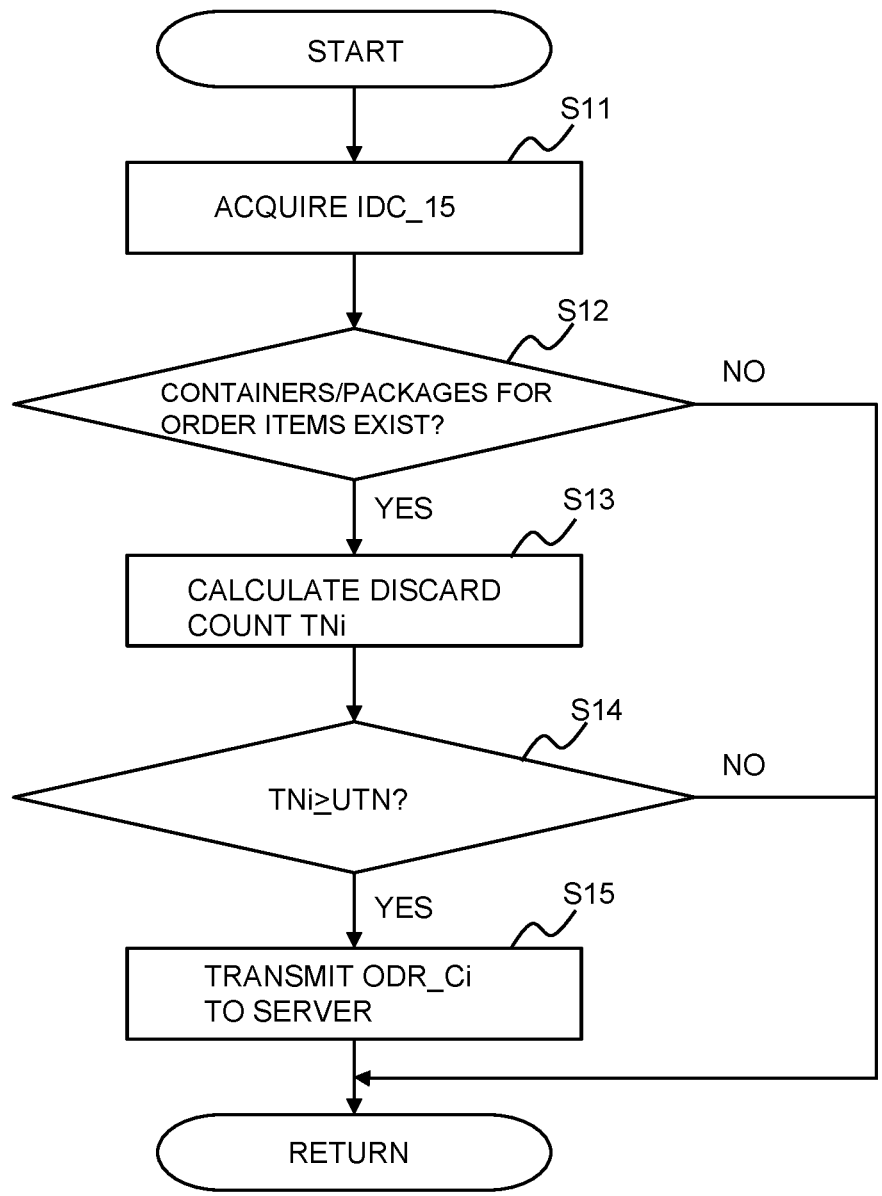
FIG. 9 is a flowchart showing a first processing example of the automated order processing.

FIG. 9 is a flowchart showing a first processing example of the automated order processing. The routine shown in FIG. 9 corresponds to the first modification example described above.

According to the routine shown in FIG. 9, first the identification data IDC_15 is acquired (step S11). As described earlier, the identification data IDC_15 is data on the contents of a packaging container read by the tag reader 15. If a camera is provided on the disposal box 14 instead of the tag reader 15, the internal status data of the disposal box 14 is acquired instead of the identification data IDC_15.

Following the processing of step S11, it is determined whether the containers/packages for order items exist in the disposal box 14 (step S12). Specifically, in the processing of step S12, it is determined whether the identification data IDC_15 acquired in step S11 contains data that matches the data (i.e., the data OBC) on the order items registered in the database 11C. If it is determined that the identification data IDC_15 does not contain data that matches the data OBC, the processing of the routine shown in FIG. 9 is finished.

If the determination result produced in step S12 is positive, a discard count TNi (1≤i≤k) is calculated (step S13). The discard count TNi is the total number of containers/packages for order items (hereinafter also referred to as an "ordered product Ci_14") in the disposal box 14. The discard count TNi is calculated for each ordered product Ci_14 based on the identification data IDC_15. If a camera is provided on the disposal box 14 instead of the tag reader 15, the discard count TNi is calculated based on the internal status data of the disposal box 14.

Following the processing of step S13, it is determined whether the discard count TNi is equal to or larger than the maximum discard count UTN (step S14). As described earlier, the maximum discard count UTN is an upper threshold set according to the classification division of the containers/packages for order items, and the data OButn on the maximum discard count UTN has been registered in the database 11C. If it is determined that the discard count TNi is smaller than the maximum discard count UTN, the processing of the routine shown in FIG. 9 is finished.

If the determination result produced in step S14 is positive, ordering data ORD_Ci of the ordered product Ci_14 is generated and transmitted to the server 21 (step S15). Note that the ordering data ORD_Ci contains data for use to pinpoint the facility 1 and the ordered product Ci as well as the data OBitv on the replenishment interval of the ordered product Ci. The processing of the routine shown in FIG. 9 may be carried out as an inventory-management-related processing of the server 21. In this case, only the ordering data ORD_Ci is generated in the processing of step S15.

4-2. Second Processing Example

Figure 10:
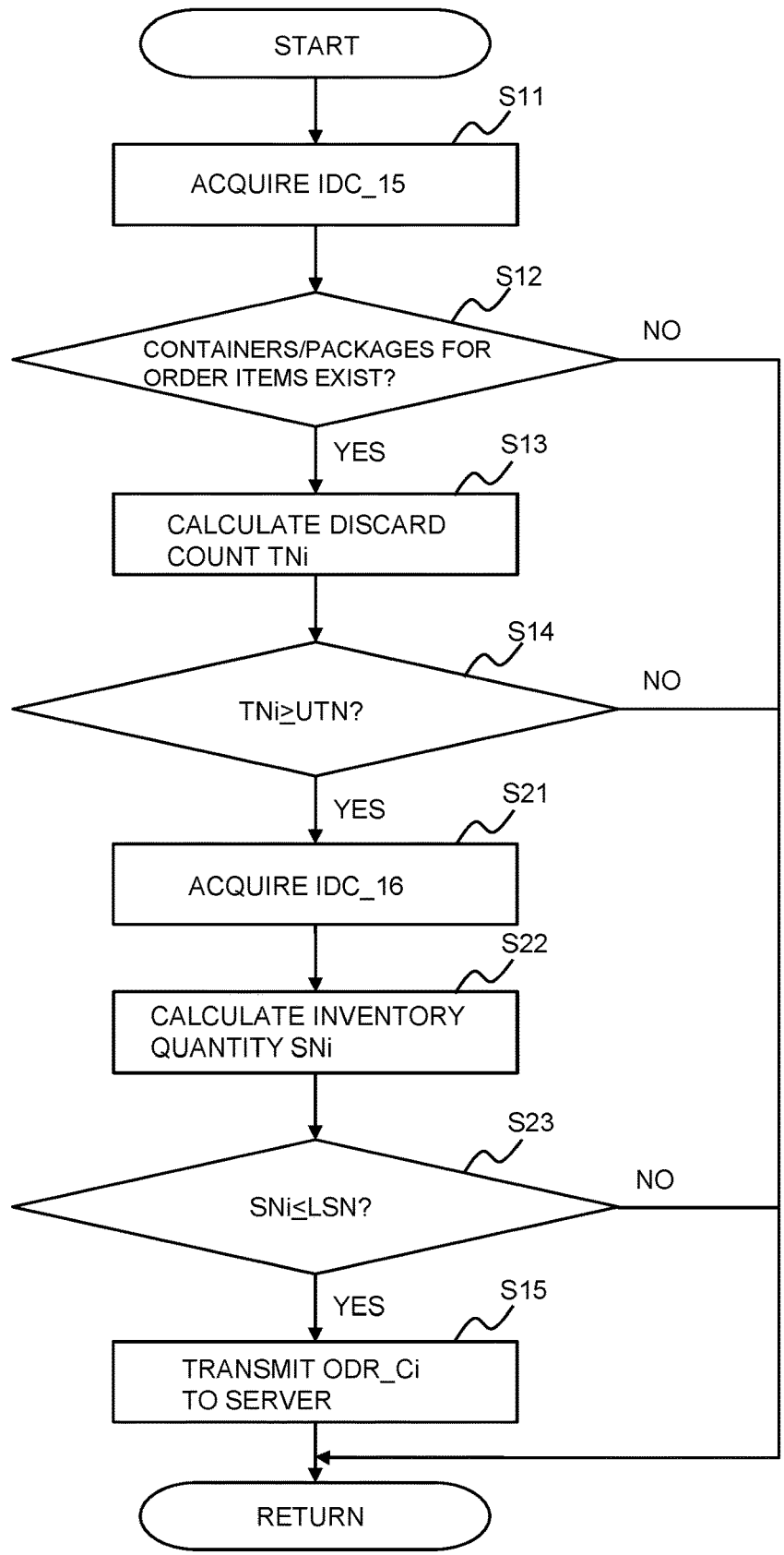
FIG. 10 is a flowchart showing a second processing example of the automated order processing.

FIG. 10 is a flowchart showing a second processing example of the automated order processing. The routine shown in FIG. 10 corresponds to the second modification example described above.

According to the routine shown in FIG. 10, first the processes of steps S11 to S14 are carried out. The processes of steps S11 to S14 are as described in FIG. 9.

If the determination result produced in step S14 is positive, the identification data IDC_16 is acquired (step S21). As described earlier, the identification data IDC_16 is data on the contents of a packaging container read by the tag reader 16. If a camera is provided on the depository 12 instead of the tag reader 16, the internal status data of the depository 12 is acquired instead of the identification data IDC_16.

Following the processing of step S21, an inventory quantity SNi is calculated (step S22). The inventory quantity SNi is the total number of order items (hereinafter also referred to as an "ordered product Ci_12") in the depository 12. The inventory quantity SNi is calculated for each ordered product Ci_12 based on the identification data IDC_16. If a camera is provided on the depository 12 instead of the tag reader 16, the inventory quantity SNi is calculated based on the internal status data of the depository 12.

Following the processing of step S22, it is determined whether the inventory quantity SNi is equal to or smaller than the minimum inventory quantity LSN (step S23). As described earlier, the minimum inventory quantity LSN is the lower threshold of the inventory quantity of the order items stored in the depository 12, and the data OBlsn on the minimum inventory quantity LSN has been registered in the database 11C. If it is determined that the inventory quantity SNi is equal to or smaller than the minimum inventory quantity LSN, the processing of step S15 is carried out. The processing of step S15 is as described in FIG. 9. On the other hand, if it is determined that the inventory quantity SNi is larger than the minimum inventory quantity LSN, the processing of the routine shown in FIG. 10 is finished. That is, in this case, no order based on the ordering data ORD_Ci is placed.

4-3. Third Processing Example

Figure 11:
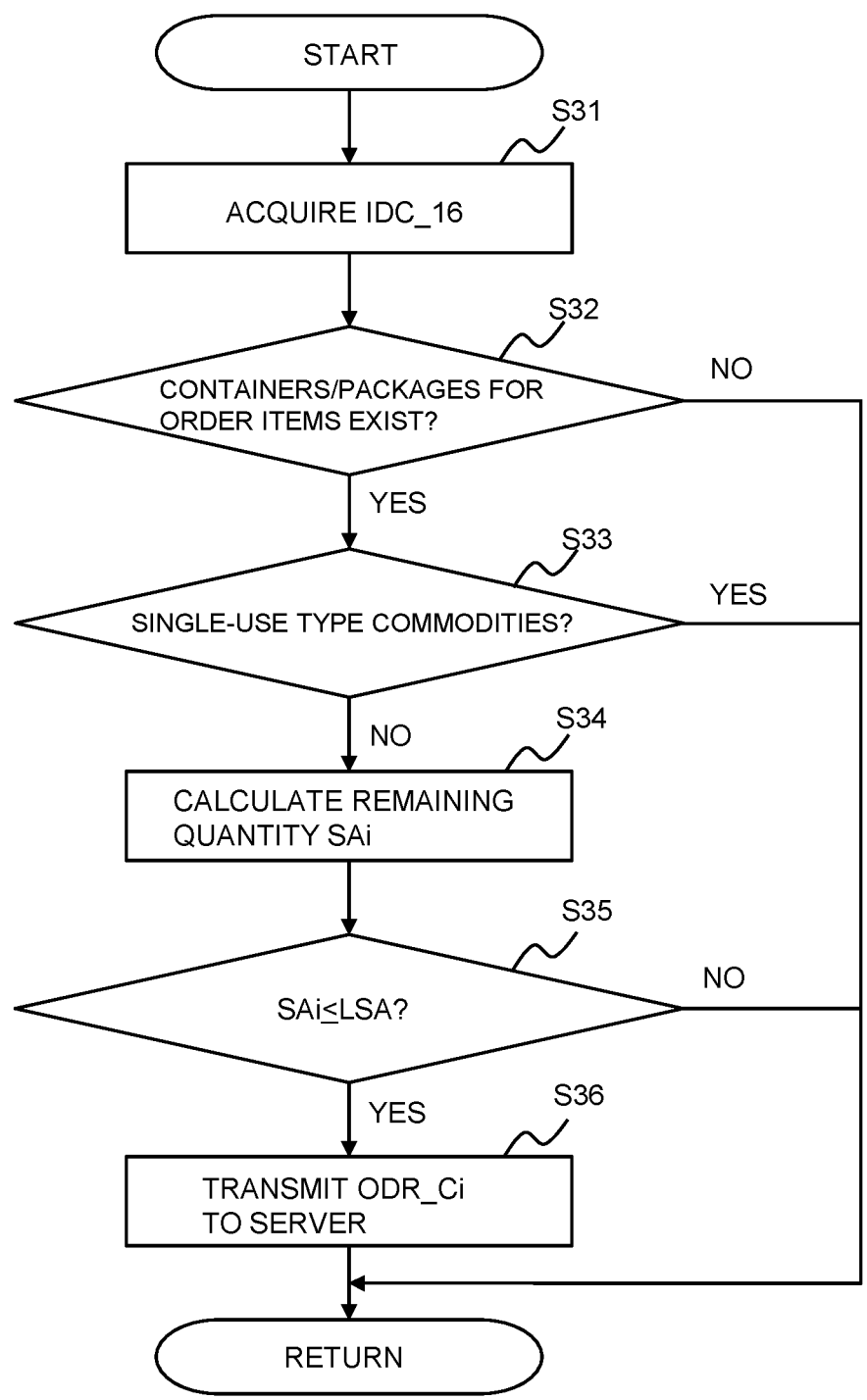
FIG. 11 is a flowchart showing a third processing example of the automated order processing.

FIG. 11 is a flowchart showing a third processing example of the automated order processing. The routine shown in FIG. 11 corresponds to the third modification example described above.

According to the routine shown in FIG. 11, first the identification data IDC_16 is acquired (step S31). Process details of step S31 are the same as those of step S21 in FIG. 10.

Following the processing of step S31, it is determined whether the containers/packages for order items exist in the depository 12 (step S32). Specifically, in the processing of step S32, it is determined whether the identification data IDC_16 acquired in step S31 contains data that matches the data (i.e., the data OBC) on the order items registered in the database 11C. If it is determined that the identification data IDC_16 does not contain data that matches the data OBC, the processing of the routine shown in FIG. 11 is finished.

If the determination result produced in step S32 is positive, it is determined whether the ordered product Ci_12 is single-use type commodities (step S33). Specifically, in the processing of step S33, based on the identification data IDC_16 acquired in step S31, it is determined whether the ordered product Ci_12 is single-use type commodities. If it is determined that the ordered product Ci_12 is single-use type commodities, the processing of the routine shown in FIG. 11 is finished.

If the determination result produced in step S33 is negative, a remaining quantity SAi is calculated (step S34). The remaining quantity SAi is the quantity of the order items remaining in the containers/packages for the ordered product Ci_12, and is calculated based on the usage status data of the ordered product Ci_12. The usage status data is, for example, the overall weight of the ordered product Ci_12 including the containers/packages, as measured by the weight sensor 17. The remaining quantity SAi is calculated as a difference between the measured overall weight and the weight of the ordered product Ci_12 grasped based on the identification data IDC_16.

Following the processing of step S34, it is determined whether the remaining quantity SAi is equal to or smaller than the minimum remaining quantity LSA (step S35). As described earlier, the minimum remaining quantity LSA is the lower threshold of the remaining quantity of the order items, and the data OBlsa on the minimum remaining quantity LSA has been registered in the database 11C. If it is determined that the remaining quantity SAi is larger than the minimum remaining quantity LSA, the processing of the routine shown in FIG. 11 is finished.

If the determination result produced in step S35 is positive, ordering data ORD_Ci of the ordered product Ci_14 is generated and transmitted to the server 21 (step S36). Process details of step S36 are the same as those of step S15 in FIG. 9. Note that the processing of the routine shown in FIG. 11 may be carried out as an inventory-management-related processing of the server 21. In this case, only the ordering data ORD_Ci is generated in the processing of step S36.

4-4. Fourth Processing Example

Figure 12:
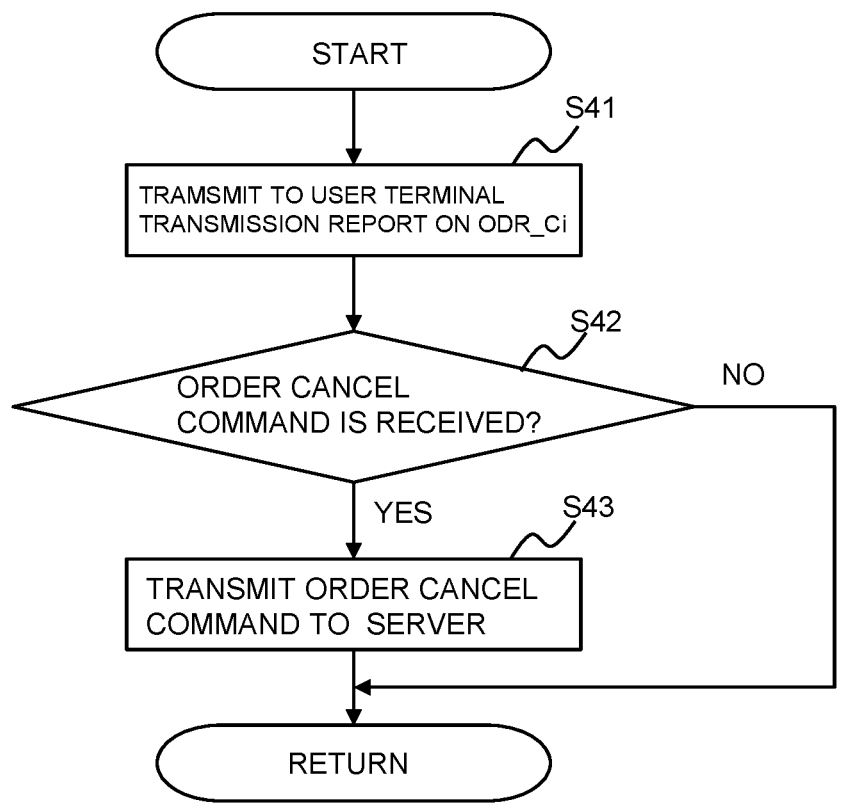
FIG. 12 is a flowchart showing a fourth processing example of the automated order processing.

FIG. 12 is a flowchart showing a fourth processing example of the automated order processing. Note that the routine shown in FIG. 12 is executed when the ordering data ORD_Ci is transmitted to the server 21 in the processing examples described in FIGS. 9 to 11.

According to the routine shown in FIG. 12, first a transmission report on the ordering data ORD_Ci is sent to the user terminal 3 (step S41). In the processing of step S41, for example, part or all of the data contained in the ordering data ORD_Ci is transmitted to the user terminal 3. In another example, the data during a period in which the order based on the ordering data ORD_Ci can be canceled is transmitted to the user terminal 3. The period is calculated based on the data OBitv on the replenishment interval.

Following the processing of step S41, it is determined whether an order cancel command is received from the user terminal 3 (step S42). The processing of step S42 is performed repeatedly for a predetermined period of time calculated based on the data OBitv on the replenishment interval. Then, if the determination result produced in step S42 is positive, an order cancel command is transmitted to the server 21 (step S43). Note that the processing of the routine shown in FIG. 12 may be carried out as an inventory-management-related processing of the server 21. In this case, the ordering data ORD_Ci is deleted in the processing of step S43.

What is claimed is:

1. An automated ordering system that provides an automated ordering service for commodities corresponding to contents of containers/packages, the system comprising:
   a disposal box at a facility;
   a tag reader or a camera provided at the disposal box, the tag reader configured to read identification tags provided on the containers/packages that have been discarded into the disposal box to obtain identification data on the contents of the containers/packages existing in the disposal box, the camera configured to obtain internal status data of the containers/packages existing in the disposal box;
   a memory storing the internal status data of the disposal box obtained by the camera or the identification data obtained by the tag reader on the contents of the container/package existing in the disposal box; and
   a processor configured to perform an automated order processing to order items registered in advance as commodities targeted for the automated ordering service, the processor configured to perform the automated order processing by:
   determining whether any container/package for the order items exists in the disposal box, based on the internal status data or the identification data on the contents of the disposal box stored in the memory;
   calculating a number of discarded containers/packages for the order items existing in the disposal box based on the internal status data or the identification data on the contents of the disposal box when it is determined that any container/package for the order items exists in the disposal box;
   determining whether the number of discarded containers/packages is equal to or larger than an upper threshold, the upper threshold being set according to a sales mode of the order items, the sales mode indicating whether the order items are sold individually or collectively; and
   generating ordering data of the order items when it is determined that the number of discarded containers/packages is equal to or larger than the upper threshold.

2. The automated ordering system according to claim 1, wherein
   the memory further stores identification data on commodities existing in a depository provided at the facility and adapted to store unused commodities or commodities in use, and
   the processor is configured to perform the automated order processing by:
   determining whether the order items exist in the depository, based on the identification data on the commodities existing in the depository;

calculating an inventory quantity of the order items based on the identification data on the commodities when it is determined that the order items exist in the depository;

determining whether the inventory quantity of the order items is larger than a lower threshold set according to the sales mode of the order items; and canceling an order for the order items placed based on the ordering data when it is determined that the inventory quantity of the order items is larger than the lower threshold.

3. The automated ordering system according to claim 1, wherein the processor is configured to perform the automated order processing:

transmitting a transmission report on the ordering data to a terminal of a user who uses the automated ordering service in the facility when the ordering data is generated; and canceling an order for the order items placed based on the ordering data when a cancel command is received from the terminal within a predetermined time after the transmission of the transmission report.

4. An automated ordering system that provides an automated ordering service for commodities, the system comprising:

a depository at a facility, the depository containing the commodities;

a tag reader provided at the depository, the tag reader configured to read identification tags provided on containers/packages of the commodities to obtain identification data on the commodities existing in the depository;

a scale provided at the depository, the scale configured to obtain weight information as usage status data on the commodities existing in the depository;

a memory storing the identification data on the commodities existing in the depository obtained by the tag reader and the usage status data on the commodities existing in the depository obtained by the scale; and a processor configured to perform an automated order processing to order items registered in advance as commodities targeted for the automated ordering service, the processor configured to perform the automated order processing by:

determining whether the order items exist in the depository, based on the identification data on the commodities stored in the memory;

calculating a remaining quantity of the order items based on the usage status data stored in the memory when it is determined that the order items exist in the depository;

determining whether the remaining quantity is equal to or smaller than a lower threshold, the lower threshold being set according to a usage mode of the order items, the usage mode indicating whether the order items are single use items or multiple use items, the multiple use items being returned to the depository after each use until the multiple use item is used-up; and generating ordering data of the order items when it is determined that the remaining quantity is equal to or smaller than the lower threshold.

5. The automated ordering system according to claim 4, wherein the processor is configured to perform the automated order processing:

transmitting a transmission report on the ordering data to a terminal of a user who uses the automated ordering service in the facility when the ordering data is generated; and canceling an order for the order items placed based on the ordering data when a cancel command is received from the terminal within a predetermined time after the transmission of the transmission report.

6. An automated ordering method performed by a computer to provide an automated ordering service for commodities corresponding to contents of containers/packages that have been discarded into a disposal box provided at a facility, a tag reader or a camera provided at the disposal box, the tag reader configured to read identification tags provided on the containers/packages that have been discarded into the disposal box to obtain identification data on the contents of the containers/packages existing in the disposal box, the camera configured to obtain internal status data of the containers/packages existing in the disposal box, the method performed by the computer and comprising the steps of:

acquiring the internal status data of the containers/packages existing in the disposal box obtained by the camera or acquiring the identification data on the contents of the containers/packages existing in the disposal box obtained by the tag reader;

determining whether any container/package for the order items registered in advance as commodities targeted for the automated ordering service exists in the disposal box, based on the internal status data or the identification data on the contents;

calculating a number of discarded containers/packages for the order items existing in the disposal box based on the internal status data or the identification data on the contents of the disposal box when it is determined that any container/package for the order items exists in the disposal box;

determining whether the number of discarded containers/packages is equal to or larger than an upper threshold, the upper threshold being set according to a sales mode of the order items, the sales mode indicating whether the order items are sold individually or collectively; and generating ordering data of the order items when it is determined that the number of discarded containers/packages is equal to or larger than the upper threshold.

7. The automated order method according to claim 6, wherein the method further comprises the steps of:

acquiring identification data on commodities existing in a depository provided at the facility and adapted to store unused commodities or commodities in use;

determining whether the order items exist in the depository, based on the identification data on the commodities existing in the depository;

calculating an inventory quantity of the order items based on the identification data on the commodities when it is determined that the order items exist in the depository;

determining whether the inventory quantity of the order items is larger than a lower threshold set according to the sales mode of the order items; and canceling an order for the order items placed based on the ordering data-if when it is determined that the inventory quantity of the order items is larger than the lower threshold.

8. The automated order method according to claim 6, wherein the method further comprises the steps of:

transmitting a transmission report on the ordering data to a terminal of a user who uses the automated ordering service in the facility when the ordering data is generated; and canceling an order for the order items placed based on the ordering data when a cancel command is received from the terminal within a predetermined time after the transmission of the transmission report.

9. An automated ordering method performed by a computer to provide an automated ordering service for commodities stored in a depository provided at a facility, the depository containing the commodities, a tag reader provided at the depository, the tag reader configured to read identification tags provided on containers/packages of the commodities to obtain identification data on the commodities existing in the depository, and a scale provided at the depository, the scale configured to obtain weight information as usage status data on the commodities existing in the depository, the method performed by the computer and comprising the steps of:

acquiring the identification data on the commodities existing in the depository obtained by the tag reader and acquiring the usage status data on the commodities existing in the depository obtained by the scale;

determining whether order items registered in advance as commodities targeted for the automated ordering service exist in the depository, based on the identification data on the commodities;

calculating a remaining quantity of the order items based on the usage status data when it is determined that the order items exist in the depository;

determining whether the remaining quantity is equal to or smaller than a lower threshold, the lower threshold being set according to a usage mode of the order items, the usage mode indicating whether the order items are single use items or multiple use items, the multiple use items being returned to the depository after each use until the multiple use item is used-up; and generating ordering data of the order items when it is determined that the remaining quantity is equal to or smaller than the lower threshold.

10. The automated order method according to claim 9, wherein the method further comprises the steps of:

transmitting a transmission report on the ordering data to a terminal of a user who uses the automated ordering service in the facility when the ordering data is generated; and canceling an order for the order items placed based on the ordering data when a cancel command is received from the terminal within a predetermined time after the transmission of the transmission report.

* * * * *

UNITED STATES PATENT AND TRADEMARK OFFICE
CERTIFICATE OF CORRECTION

PATENT NO. : 12,125,069 B2
APPLICATION NO. : 17/840149
DATED : October 22, 2024
INVENTOR(S) : Nobuhisa Otsuki et al.

Page 1 of 1

It is certified that error appears in the above-identified patent and that said Letters Patent is hereby corrected as shown below:

On the Title Page

After item (65), add:
-- (30) Foreign Application Priority Data
July 14, 2021 (JP) .................................... 2021-116399 --

Signed and Sealed this
Thirtieth Day of December, 2025

John A. Squires
*Director of the United States Patent and Trademark Office*